United States Patent
Kattepur et al.

(10) Patent No.: US 10,439,890 B2
(45) Date of Patent: Oct. 8, 2019

(54) OPTIMAL DEPLOYMENT OF FOG COMPUTATIONS IN IOT ENVIRONMENTS

(71) Applicant: Tata Consultancy Services Limited, Mumbai (IN)

(72) Inventors: Ajay Kattepur, Bangalore (IN); Hemant Kumar Rath, Bangalore (IN); Anantha Simha, Bangalore (IN)

(73) Assignee: Tata Consultancy Services Limited, Mumbai (IN)

(*) Notice: Subject to any disclaimer, the term of this patent is extended or adjusted under 35 U.S.C. 154(b) by 218 days.

(21) Appl. No.: 15/653,190

(22) Filed: Jul. 18, 2017

(65) Prior Publication Data

US 2018/0109428 A1    Apr. 19, 2018

(30) Foreign Application Priority Data

Oct. 19, 2016 (IN) .............................. 201621035796

(51) Int. Cl.
*G06F 15/16* (2006.01)
*H04L 12/24* (2006.01)
(Continued)

(52) U.S. Cl.
CPC ........ *H04L 41/145* (2013.01); *G06F 9/45504* (2013.01); *H04L 41/0823* (2013.01);
(Continued)

(58) Field of Classification Search
USPC ....... 703/203, 206, 217, 219, 223, 224, 226, 703/228, 230, 232, 238; 713/168;
(Continued)

(56) References Cited

U.S. PATENT DOCUMENTS

| | | | |
|---|---|---|---|
| 7,197,639 B1* | 3/2007 | Juels ....................... | H04L 63/08 726/14 |
| 8,014,308 B2* | 9/2011 | Gates, III ................ | H04L 12/66 370/252 |

(Continued)

FOREIGN PATENT DOCUMENTS

DE       102013001107       7/2014

*Primary Examiner* — Quang N Nguyen
(74) *Attorney, Agent, or Firm* — Finnegan, Henderson, Farabow, Garrett & Dunner LLP

(57) ABSTRACT

This disclosure relates to managing Fog computations between a coordinating node and Fog nodes. In one embodiment, a method for managing Fog computations includes receiving a task data and a request for allocation of at least a subset of a computational task. The task data includes data subset and task constraints associated with at least the subset of the computational task. The Fog nodes capable of performing the computational task are characterized with node characteristics to obtain resource data associated with the Fog nodes. Based on the task data and the resource data, an optimization model is derived to perform the computational task by the Fog nodes. The optimization model includes node constraints including battery degradation constraint, communication path loss constraint, and heterogeneous computational capacities of Fog nodes. Based on the optimization model, at least the subset of the computational task is offloaded to a set of Fog nodes.

17 Claims, 9 Drawing Sheets

(51) Int. Cl.
*G06F 9/455* (2018.01)
*H04L 29/08* (2006.01)
*H04L 12/26* (2006.01)
*H04W 4/70* (2018.01)
*H04W 52/02* (2009.01)

(52) U.S. Cl.
CPC ...... *H04L 41/0886* (2013.01); *H04L 43/0852* (2013.01); *H04L 67/10* (2013.01); *H04W 4/70* (2018.02); *H04L 41/0213* (2013.01); *H04L 43/10* (2013.01); *H04W 52/0254* (2013.01); *H04W 52/0261* (2013.01); *Y02D 70/142* (2018.01); *Y02D 70/144* (2018.01); *Y02D 70/162* (2018.01)

(58) Field of Classification Search
USPC ........................................................ 370/252
See application file for complete search history.

(56) References Cited

U.S. PATENT DOCUMENTS

| | | | |
|---|---|---|---|
| 8,984,500 | B2 | 3/2015 | Mesarina et al. |
| 9,049,248 | B2 | 6/2015 | Singh et al. |
| 9,584,876 | B2* | 2/2017 | Zucchetta ............ H04N 21/458 |
| 9,641,431 | B1* | 5/2017 | Fellows ................. H04L 45/46 |
| 9,734,659 | B2* | 8/2017 | Ovalle .................... H04W 4/21 |
| 2012/0331144 | A1* | 12/2012 | Supalov ................ G06F 9/5072 |
| | | | 709/226 |
| 2016/0112518 | A1 | 4/2016 | Haleem et al. |
| 2016/0124407 | A1 | 5/2016 | Kallio et al. |
| 2017/0116526 | A1* | 4/2017 | Salam .................... G06N 5/003 |
| 2017/0228258 | A1* | 8/2017 | Shifman ................ H04L 67/10 |
| 2017/0250873 | A1* | 8/2017 | Tee ....................... G06F 16/951 |
| 2018/0146058 | A1* | 5/2018 | Somayazulu ........... H04L 43/16 |

* cited by examiner

OPTIMAL DEPLOYMENT OF FOG COMPUTATIONS IN IOT ENVIRONMENTS

PRIORITY CLAIM

This U.S. patent application claims priority under 35 U.S.C. § 119 to: India provisional application No. 201621035796, filed on Oct. 19, 2016. The entire contents of the aforementioned application are incorporated herein by reference.

TECHNICAL FIELD

This disclosure relates generally to Fog computing, and more particularly to system and methods for optimal deployment of Fog computations in Internet of Things (IoT) environments.

BACKGROUND

Typically, cloud computing has been utilized as a central storage repository for Internet of things (IoT) devices since with cloud computing, data stored centrally can be accessed for computation or actuation. However, the data of high volume, velocity, variety, variability that is produced in IoT applications, additional architectural modifications to storage and processing architectures may be desirable.

In order to extend the cloud to be closer to the things that produce and act on IoT data, Fog computing can be used. Fog computing is particularly suited for IoT applications where sensors are typically mobile and produce data at large volumes and/or velocity. Moving the control and actuation servers to nodes nearer to the edge devices also reduces traffic on the cloud data centre, while still maintaining low latency overheads. Typically any device with computing, storage, and network connectivity can be a Fog node. For instance, devices such as industrial controllers, switches, routers, embedded servers, video surveillance cameras, and so on, may be example of Fog nodes. As the number of IoT devices scales to trillions of devices, various performance bottlenecks in last mile connectivity and central cloud access may occur.

SUMMARY

Embodiments of the present disclosure present technological improvements as solutions to one or more of the above-mentioned technical problems recognized by the inventors in conventional systems. For example, in one embodiment, a processor-implemented method for dynamically managing Fog computations between a coordinating node and a plurality of Fog nodes is provided. The method includes receiving, a request for allocation of at least a subset of a computational task, and a task data associated with the computational task, via one or more hardware processors. The task data includes data subset and one or more task constraints associated with at least the subset of the computational task. Further, the method includes characterizing the plurality of Fog nodes capable of performing the computational task with a plurality of node characteristics to obtain a resource data associated with the plurality of Fog nodes, via the one or more hardware processors. Furthermore the method includes deriving, based on the task data and the resource data, an optimization model for performing the computational task by the plurality of Fog nodes, via the one or more hardware processors. The optimization model is derived based on a plurality of node constraints including battery degradation constraint, communication path loss constraint, and heterogeneous computational capacities of the plurality of Fog nodes. Moreover, the method includes offloading at least the subset of the computational task to a set of Fog nodes from the plurality of Fog nodes based on the optimization model, via the one or more hardware processors.

In another embodiment, a system for dynamically managing Fog computations between a coordinating node and a plurality of Fog nodes is provided. The system includes one or more memories storing instructions; and one or more hardware processors coupled to the one or more memories receive, a request for allocation of at least a subset of a computational task, and a task data associated with the computational task. The task data includes data subset and one or more task constraints associated with at least the subset of the computational task. Further, the one or more hardware processors are further configured by the instructions to characterize the plurality of Fog nodes capable of performing the computational task with a plurality of node characteristics to obtain a resource data associated with the plurality of Fog nodes. Furthermore, the one or more hardware processors are further configured by the instructions to derive, based on the task data and the resource data, an optimization model for performing the computational task by the plurality of Fog nodes. The optimization model is derived based on a plurality of node constraints including battery degradation constraint, communication path loss constraint, and heterogeneous computational capacities of the plurality of Fog nodes. Moreover, the one or more hardware processors are further configured by the instructions to offload at least the subset of the computational task to a set of Fog nodes from the plurality of Fog nodes based on the optimization model.

In yet another embodiment, a non-transitory computer-readable medium having embodied thereon a computer program for executing a method for dynamically managing Fog computations between a coordinating node and a plurality of Fog nodes is provided. The method includes receiving, a request for allocation of at least a subset of a computational task, and a task data associated with the computational task. The task data includes data subset and one or more task constraints associated with at least the subset of the computational task. Further, the method includes characterizing the plurality of Fog nodes capable of performing the computational task with a plurality of node characteristics to obtain a resource data associated with the plurality of Fog nodes. Furthermore the method includes deriving, based on the task data and the resource data, an optimization model for performing the computational task by the plurality of Fog nodes. The optimization model is derived based on a plurality of node constraints including battery degradation constraint, communication path loss constraint, and heterogeneous computational capacities of the plurality of Fog nodes. Moreover, the method includes offloading at least the subset of the computational task to a set of Fog nodes from the plurality of Fog nodes based on the optimization model.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
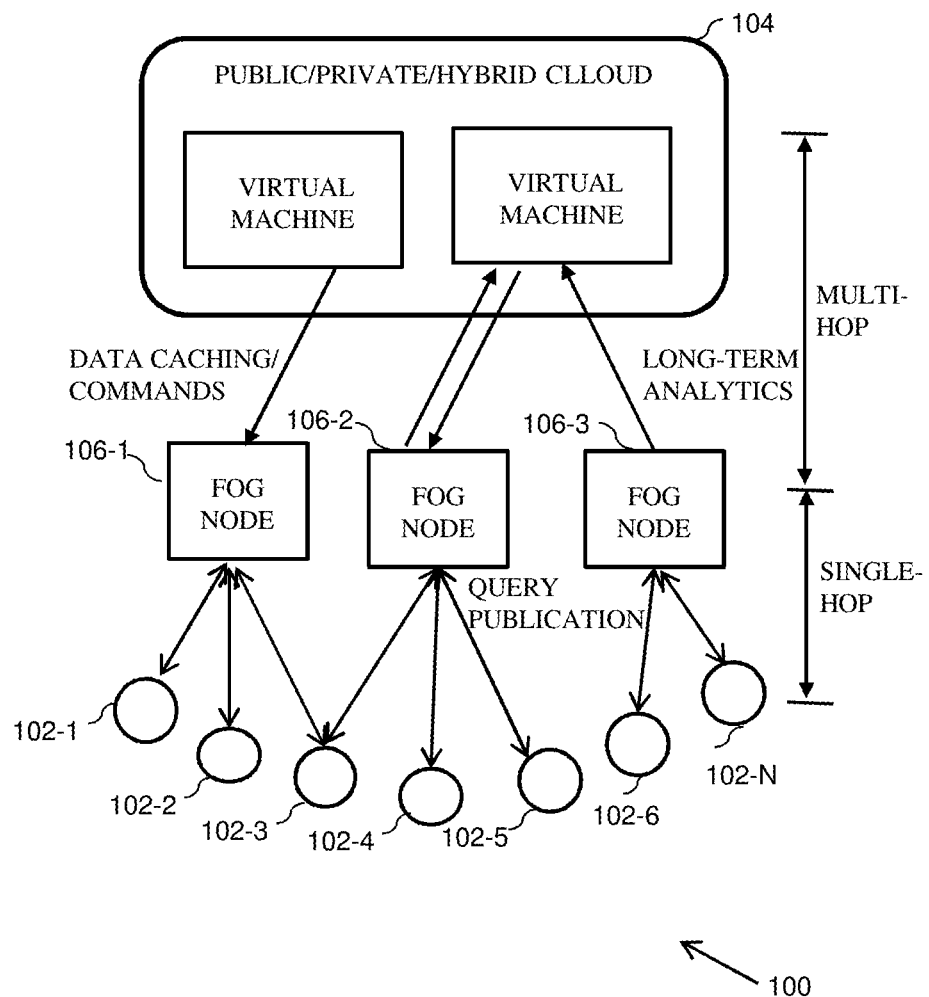
FIG. 1 illustrates an exemplary deployment of an IoT application with Fog, in accordance with an example embodiment.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The Internet of things (IoT) typically combines the sense-actuate-compute capability of sensor networks, mobility patterns of cellular devices and large scale data volumes of Big Data applications. Cloud computing has further emerged as a central tenet in energy-efficient computing that allows on-demand scaling up/out of virtual machines as per requirements.

The cloud has been typically utilized as a central storage repository for IoT devices as the data stored centrally can be accessed for computation and/or actuation purposes. While the elastic scaling and energy-efficiency of the cloud are appropriate in many cases, the kind of applications that do not typically fit in a central cloud environment may include, but are not limited to applications needing low latency access to storage, computation; geographically distributed sources that can have vast differences in data transfer and processing timelines; and applications requiring near-real time control or actuation of devices. Moreover, in order to coordinate the high volume, velocity, variety, variability of data that are produced in IoT applications, additional architectural modifications are needed with respect to cloud computing architectures. As the number of IoT devices scales to trillions of devices, various performance bottlenecks in last mile connectivity and central cloud access may occur.

Typically Fog computing provides solutions to the aforementioned limitations related to cloud-based computing. "Fog Computing" is motivated by moving data and computation close to the edge of the networks. For example, for IoT applications where sensors are typically mobile and produce data at large volumes and/or velocity, moving control and actuation servers to nodes nearer to the edge devices reduces traffic on the cloud data centre, while still maintaining low latency overheads. Typically any device with computing, storage, and network connectivity can be a fog node. Examples of such devices include industrial controllers, switches, routers, embedded servers, video surveillance cameras, and so on.

Fog computing is a scalable version of the edge that exploits smart gateway devices. The terms 'Fog' and 'Edge' are synonymous to both end devices (mobile nodes) and intelligent gateway devices. The terms 'Fog computing' and 'Edge computing' are synonymous, and accordingly, the terms Fog computing and Edge computing have been used interchangeably throughout the description. A typical deployment example of an IoT application with Fog is presented in FIG. 1.

FIG. 1 illustrates an example network deployment 100 of an IoT application with Fog. The network deployment 100 of the IoT application is shown to include a plurality of mobile sensors 102-1, 102-2 . . . 102-N distributed geographically, a plurality of Fog compute and/or actuate nodes 104-1, 104-2, . . . 104-N, a cloud 106 comprising virtual machines such as virtual machines 108-1, 108-2. For the brevity of description, hereinafter, the plurality of mobile sensors 102-1, 102-2 . . . 102-N may hereinafter be referred to as sensors 102, and the plurality of Fog nodes may be referred to as fog nodes 104. The mobile sensors 102 collect sensor data. Based on the sensor data, Fog compute/actuate nodes are deployed on edge network devices to handle computation and actuation. Periodic snapshots or analytics on the data are stored in the cloud data centre. While the cloud may be used for long term analysis and goal setting, the geographically distributed set of mobile services make use of Fog nodes 104 for computation.

When focusing on IoT, communicating and coordinating sensor and/or actuator data received via sensors 102, via the cloud, for example the cloud 106 involves inefficient overheads and reduces autonomous behaviour. The Edge/Fog computing paradigm consisting of Fog nodes such as Fog nodes 104 is configured to move the compute/actuate functions closer to sensing entities by exploiting peers and intermediary nodes. Some of the advantages of moving much of the storage/computation/actuation to the edge of the IoT application environment includes latency reduction, improvement in network bandwidth, improved reliability and geo-optimization. Herein, low-latency response times matter in sensitive applications involving large factory units, health care and industrial outputs. Reducing data transfer requirements can help shave off crucial seconds in the auto-actuation of devices, and in latency reduction. Moreover, with large-scale IoT sensors collecting multiple TBs of data, transporting data would mean large network bandwidth requirements, and hence affecting network bandwidth. Virtual Machine failure, network bottlenecks and last-mile connectivity problems are typical of large scale deployments. By distributing computation and storage, reliability and redundancy of data can be further guaranteed, thereby improving reliability. Additionally, while typical cloud deployments remain agnostic to geo-location of devices, the Fog computing paradigm incorporates the aspect of geo-optimization into the architecture, and hence decision making is done closer to source with periodic analytics provided by the cloud.

The movement of the compute/actuate functions closer to sensing entities entails reduced centralized communication with the cloud and increased coordination between sensing entities and (possibly available) networked switches/routers/gateway devices. However, the typical Fog computing is limited in incorporating the effect of obstacles or indoor multi-path effects as well as effects of transmission frequencies while determining communication overheads between Fog nodes.

To address the aforementioned limitations while using resource limited devices, the utility of offloading computation among peers with respect to computation latency and energy depletion has been provided by determining the trade-offs involved with such computation offloading. Various embodiments of the present disclosure present an optimization formulation that can be applied to various deployment scenarios of a network of devices, taking the computation and communication overheads into account. As will be described later in the description, the disclosed method is implemented on an embedded network of robots developed using ROS ("Robot Operating System") and Gazebo, that may coordinate to complete a complex computational task. Another embodiment demonstrates an improvement of 90% latency and 54% battery usage over a large computation task, by applying the proposed optimal offloading technique.

The method(s) and system(s) for optimal deployment of Fog computations in IoT environments are further described in conjunction with the following figures. It should be noted that the description and figures merely illustrate the principles of the present subject matter. It will thus be appreciated that those skilled in the art will be able to devise various arrangements that, although not explicitly described or shown herein, embody the principles of the present subject matter and are included within its spirit and scope. Furthermore, all examples recited herein are principally intended expressly to be only for pedagogical purposes to aid the reader in understanding the principles of the present subject matter and the concepts contributed by the inventor(s) to furthering the art, and are to be construed as being without limitation to such specifically recited examples and conditions. Moreover, all statements herein reciting principles, aspects, and embodiments of the present subject matter, as well as specific examples thereof, are intended to encompass equivalents thereof.

Figure 2:
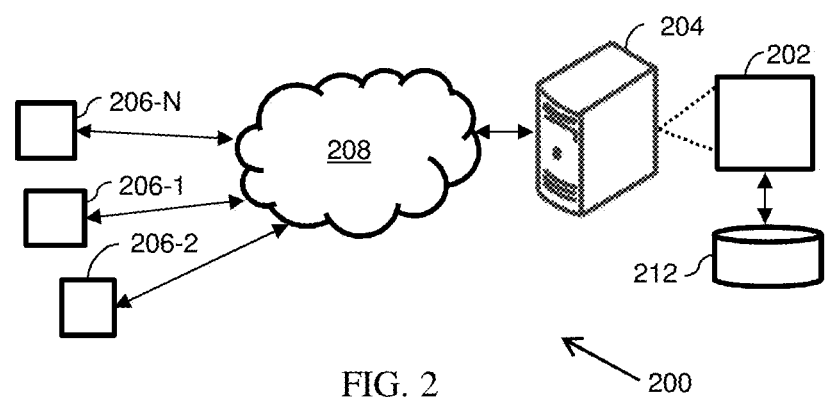
FIG. 2 is a networking environment implementing system for optimal deployment of Fog computations in IoT environments, in accordance with an embodiment of the present subject matter.

FIG. 2 illustrates a network environment 200 implementing a system 202 for optimal deployment of Fog computations in IoT environments, according to an embodiment of the present subject matter. In an embodiment, the system 202 receives a set of computations that have to be optimally deployed after considering the communication overheads, latency constraints and energy depletion of operational devices. The system 202 automatically deploys the computations received in a peer based topology and collaboratively communicates and coordinates with the remaining nodes.

Although the present disclosure is explained considering that the system 202 is implemented on a server, it may be understood that the system 202 may also be implemented in a variety of computing systems, such as a laptop computer, a desktop computer, a notebook, a workstation, a cloud-based computing environment, Fog or edge computing environment and the like. In one implementation, the system 202 may be implemented in a Fog or edge based environment. It will be understood that the system 202 may be accessed by multiple devices 206-1, 206-2 . . . 206-N, collectively referred to as Fog devices 206 hereinafter, or applications residing on the Fog devices 206. Examples of the Fog devices 206 may include, but are not limited to, a portable computer, a personal digital assistant, a handheld device, a Smartphone, a Tablet Computer, a workstation, industrial controllers, switches, routers, embedded servers, video surveillance cameras and the like. The Fog devices 206 are communicatively coupled to the system 202 through a network 208.

In an embodiment, the network 208 may be a wireless or a wired network, or a combination thereof. In an example, the network 208 can be implemented as a computer network, as one of the different types of networks, such as virtual private network (VPN), intranet, local area network (LAN), wide area network (WAN), the internet, and such. The network 206 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 208 may include a variety of network devices, including routers, bridges, servers, computing devices, storage devices. The network devices within the network 208 may interact with the system 202 through communication links.

The system 202 is capable of offloading computations among Fog computing nodes 206 or peers, thereby resulting in energy and latency improvements. The system 202 makes use of accurate battery degradation and communication path loss corresponding to the Fog computing nodes, and accordingly provides an optimal deployment, in which computation may be optimally shared among the fog nodes. The optimization deployment can be applied to various deployment scenarios of a network of devices, and takes the computation and communication overheads into account.

As discussed above, the system 202 may be implemented in a computing device 204, such as a hand-held device, a laptop or other portable computer, a tablet computer, a mobile phone, a PDA, a smartphone, and a desktop computer. The system 202 may also be implemented in a workstation, a mainframe computer, a server, and a network server. In an embodiment, the system 202 may be coupled to a data repository, for example, a repository 212. The repository 212 may store data processed, received, and generated by the system 202. In an alternate embodiment, the system 202 may include the data repository 212. The components and functionalities of the system 202 are described further in detail with reference to FIG. 3.

Figure 3:
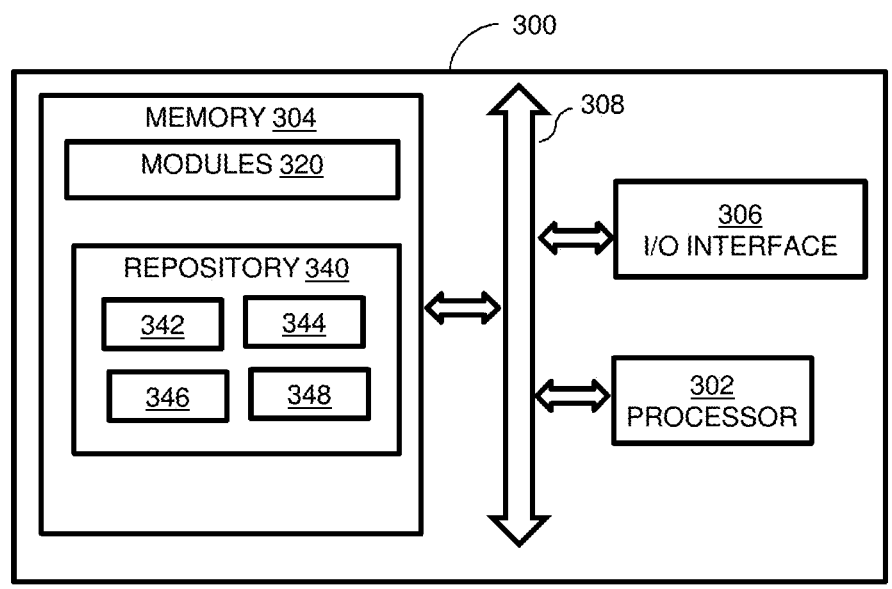
FIG. 3 illustrates a block diagram of a system for optimal deployment of Fog computations in IoT environments, in accordance with an example embodiment.

FIG. 3 illustrates a block diagram of a system 300 for optimal deployment of Fog computations in IoT environments, in accordance with an example embodiment. The system 300 may be an example of the system 202 (FIG. 2). In an example embodiment, the system 300 may be embodied in, or is in direct communication with the system, for example the system 202 (FIG. 2). In an embodiment, the system 300 facilitates optimal deployment of Fog computations by considering sense-compute-actuate paradigms such as limited battery capacity, communication overheads and heterogeneous computational capacities in Fog based IoT environments. The system 300 includes or is otherwise in communication with one or more hardware processors such as a processor 302, one or more memories such as a memory 304, and an I/O interface 306. The processor 302, the memory 304, and the I/O interface 306 may be coupled by a system bus such as a system bus 308 or a similar mechanism.

The I/O interface 306 may include a variety of software and hardware interfaces, for example, a web interface, a graphical user interface, and the like The interfaces 306 may include a variety of software and hardware interfaces, for example, interfaces for peripheral device(s), such as a keyboard, a mouse, an external memory, a camera device, and a printer. Further, the interfaces 306 may enable the system 300 to communicate with other devices, such as web servers and external databases. The interfaces 306 can facilitate multiple communications within a wide variety of networks and protocol types, including wired networks, for example, local area network (LAN), cable, etc., and wireless networks, such as Wireless LAN (WLAN), cellular, or satellite. For the purpose, the interfaces 306 may include one or more ports for connecting a number of computing systems with one another or to another server computer. The I/O interface 306 may include one or more ports for connecting a number of devices to one another or to another server.

The hardware processor 302 may be implemented as one or more microprocessors, microcomputers, microcontrollers, digital signal processors, central processing units, state machines, logic circuitries, and/or any devices that manipulate signals based on operational instructions. Among other capabilities, the hardware processor 302 is configured to fetch and execute computer-readable instructions stored in the memory 304. In an embodiment, the processor is configured by the instructions stored in the memory, thereby causing the system 300 to perform various functions, as described later in the description below.

The memory 304 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 304 includes a plurality of modules 320 and a repository 340 for storing data processed, received, and generated by one or more of the modules 320. The modules 320 may include routines, programs, objects, components, data structures, and so on, which perform particular tasks or implement particular abstract data types.

The repository 340, amongst other things, includes a system database 342 and other data 344. The other data 344 may include data generated as a result of the execution of one or more modules in the modules 320. The repository 340 is further configured to maintain computations data 346 pertaining to the computation to be offloaded and sensor data 348 collected by Fog nodes. The sensor data 348 and the computation data 346 will be explained further in the description below.

According to the present subject matter, the system 300 represents a framework for optimal deployment of Fog computations in IoT environments. The system 300 is caused to define a computational task and a plurality of constraints associated with the computational task. In an embodiment, the computational task may be a computationally intensive task to be performed by a single node, hence at least a subset of the computational task may be offloaded to peer nodes (for example, fog devices) that are capable of performing said computations. However, since each peer node may be associated with different capabilities and configurations, the system 300 may be caused to assess said capabilities and configurations. Based on said determination, the system 300 may be caused to offload the computational tasks to different peer nodes according to their capabilities and configurations in a most optimal way. The capabilities and configurations of the peer nodes can be determined by applying certain constraints to the available network of peers or Fog nodes. In an embodiment, the constraints applied by the system 300 may include, but are not limited to battery resources, communication path loss and computation on devices (or Fog nodes) with heterogeneous hardware.

Herein, in an embodiment, the system 300 may be embodied in the node that is intended to perform the computational task. Accordingly, in the present embodiment, the node acts as a coordinating node, and is accordingly caused to optimally offload the computational tasks to different peer nodes according to capabilities and configurations of said peer nodes. Alternatively, the system 300 may be embodied in a node, known as coordinating node, and said coordinating node may be in communication with the node that is intended to perform the computational task. The node may communicate with the coordinating node, and request for allocation of at least a subset of the computational task to one or more peer nodes.

Herein, in addition to the request for allocation of at least the subset of the computational task, the coordinating node may also receive a task data associated with the computational task. The task data includes data subset and one or more constraints associated with at least the subset of the computational task.

The system 300 is caused to characterize the plurality of Fog nodes capable of performing the computational task with a plurality of node characteristics. Herein, characterizing the plurality of Fog nodes refers to obtaining a resource data associated with the plurality of Fog nodes. The resource data herein includes node location, current drawn during computation and communication, total battery capacity, number of CPU cores and CPU operating frequency associated with the plurality of Fog nodes. The system 300 is caused to obtain said resource data associated with the potential nodes in the network. In an embodiment, the resource data may be stored in the repository of the system 300. In an embodiment, the resource data may be made available to the coordinating node for storing in the repository of the system 300 continually or after predetermined time intervals. In an embodiment, the resource data or the information about the locations, battery states and computational power of all peer nodes can be broadcasted periodically to the coordinating node. Each peer node can publish information about locations, battery states and computational power and the coordinating node can subscribe to such information. In an embodiment, polling said information periodically is also possible. For example, protocols such as Simple Network Monitoring Protocol (SNMP) can be exploited for polling said information.

Based on the task data and the resource data, the system 300 is caused to derive an optimization model for performing the computational task by the plurality of Fog nodes. To analyze and determine crucial features involved with IoT devices that may be associated with the Fog, the system 300 is caused to derive an optimization model based on the resource data. Accordingly, in an embodiment, the optimization model is derived based on a plurality of constraints including, but not limited to, battery degradation constraint, communication path loss constraint, and heterogeneous computational capacities of the plurality of Fog nodes.

As battery utilization is one of a crucial features involved with IoT devices that may be associated with the Fog, in an embodiment, deriving the optimization model includes deriving a battery optimization model for optimizing battery consumed in performing the computational task by each of the plurality of Fog nodes. The battery optimization model is capable of analyzing battery discharge profiles and associate lifetimes of the Fog nodes. In an embodiment, the optimization model is derived based on battery consumed as a result of computation of battery consumed by the plurality of Fog nodes and a two way communication overheard. Herein, the battery consumed may refer to the battery consumed by the Fog nodes for a computation cycle c.

When using a non-uniform discharge, the average discharging values may be employed:

$$L = \frac{a}{\left[\frac{\sum_{K=0}^{N} I_k(t_k - t_{k-1})}{L}\right]^b} \quad (1)$$

Where, L is value of battery lifetime. Typically the value of a is close to battery capacity and b is a value in the range [1.2, 1.7].

The communication path loss during the communication between the coordinating node and the set of Fog nodes may incorporate the effect of obstacles or indoor multi-path effects as well as effects of transmission frequencies. In an embodiment, the communication path loss model may include:

$$P_t - P_r(dBm) = 20 \log_{10} f + K \log_{10}(d) + N_w L_w - 20 \quad (2)$$

where f is the transmit frequency in MHz,
K is an attenuation factor derived based on the transmit frequency ($\approx$19 for 2.4 GHz), number $N_w$ and loss $L_w$ due to obstacles Herein, the loss due to obstacles from measurements can range from 1 dB for glass, 7 dB for brick to 25 dB for concrete structures. When dealing with varied transmission solutions such as Wifi, Zigbee, Bluetooth and UWB, incorporation of the transmit frequencies can affect the measured path loss.

In an embodiment, optimizing the battery consumption may include deriving the battery optimization model for solving a linear programming problem with the battery consumed as a result of computation $P_i^c$ (eq. 1) and two way communication overhead 2. $P_1^t\{f, d_{1_i}\}$ (eq. 2) incorporated.

The total computation task C is allocated to participating devices, with a maximal battery capacity of $P_i^{cap}$. The optimization model may include:

$$\min P_1^C \cdot r1 + \Sigma_{i=2}^N (P_i^C + 2 \cdot P_1^t\{f, d_{1_i}\}) \cdot r_i$$

Such that, $\Sigma_{i=1}^N r_i = C$ $P_i \cdot r_i \leq P_i^{Cap}, \forall i \in N$ $r_i \geq 0, \forall i \in N$ In an embodiment, the Fog nodes may have battery recharges between subsequent task executions, and thus $P_i^{Cap}$ may be constant. Alternatively, there may be no battery re-charges between runs. In the present embodiment, where there are no battery re-charges between runs, a new constraint $P_i'^{Cap} = P_i^{Cap} - P_i^C \cdot r_i$ may account for the power lost due to the optimal allocation during the previous execution. For the most deteriorated battery $P_i^{Cap} \rightarrow 0$ is the quickest.

In another embodiment, deriving the optimization model includes deriving a latency optimization model for optimizing a time to complete the computational task based on the resource data by the set of Fog nodes. As each Fog node may have a specific number of CPU cores $cc_i$ with corresponding operating frequency $h_i$, the time to complete a computation may be incorporated. For instance, a single core CPU running at 1.2 GHz would perform 8 times slower than a quad-core 2.4 GHz CPU. The optimization model may incorporate the transmission throughput $t_{j_i}$ for data from one user to another. In an embodiment, deriving the latency optimization model includes minimizing an objective function associated with a transmission throughput $t_{j_i}$ of the resource data based on an equation:

$$\min\left(\frac{1}{CC_1 \cdot h_1}\right) \cdot r_1 + \sum_{i=2}^{N} \left(\frac{1}{CC_i \cdot h_i} + \frac{1}{t_{1_i}}\right) \cdot r_i +$$

Such that, $\Sigma_{i=1}^N r_i = C$ $r_i \geq 0, \forall i \in N3$.

In yet another embodiment, deriving the optimization model includes deriving a combined model including the battery optimization model and the latency optimization model. In an example embodiment, the primary cost function to be minimized may capture the battery constraint, and the entire computational task may be completed within the latency constraint L:

$$\min P_1^C \cdot r_1 + \sum_{i=2}^{N} (P_i^C + P_i^C + 2 \cdot P_1^t\{f, d_{1_i}\}) \cdot r_i$$

Such that, $\Sigma_{i=1}^N r_i = C$ $$\left(\frac{1}{CC_1 \cdot h_1}\right) \cdot r_1 + \sum_{i=2}^{N} \left(\frac{1}{CC_i \cdot h_i} + \frac{1}{t_{1_i}}\right) \cdot r_i \leq L$$

$P_i \cdot r_i \leq P_i^{Cap}, \forall i \in N$ $r_i > 0, \forall i \in N$

In an embodiment, the system 300 may be caused to offload at least the subset of the computational task to a set of Fog nodes from the plurality of Fog nodes based on the optimization model. In an embodiment, the system 300 may be caused to collate output of performing of the subset of computational task from the set of Fog nodes to obtain result of offloaded subset of the computational task.

Herein, it will be understood that the coordinating node can communicate with the plurality of Fog nodes using any one of a proxy-based communication topology, peer-based communication topology and clone-based communication topology. For example, a client-server ensures bi-directional transfer of data combined with one-to-one communication. The client node requests for some data and waits for the reply; the server receives the request, performs the required computation/actuation and sends a response to the client.

Figure 4:
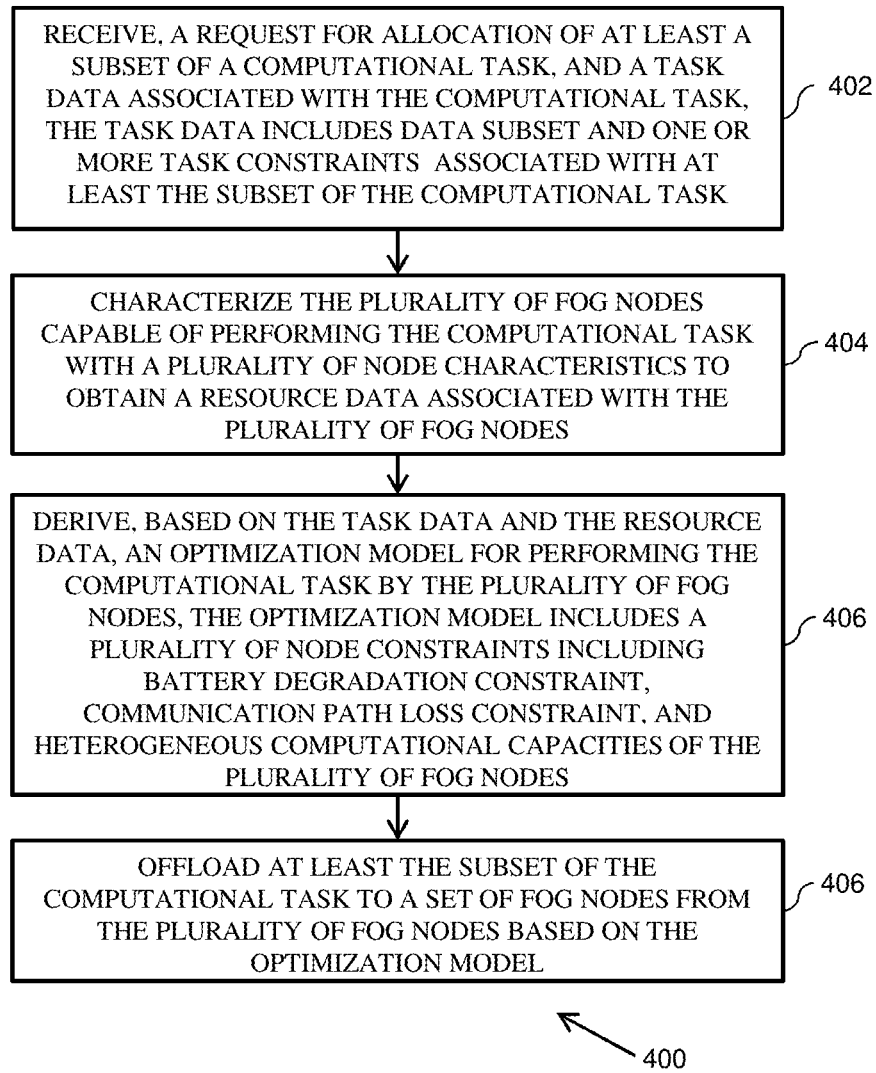
FIG. 4 illustrates an example flow-diagram of a method for optimal deployment of Fog computations in IoT environments, in accordance with an example embodiment.

FIG. 4 illustrates an example flow-diagram of a processor-implemented method 400 for optimal deployment of Fog computations in IoT environments, in accordance with an example disclosure. The method 400 may be described in the general context of computer executable instructions. Generally, computer executable instructions can include routines, programs, objects, components, data structures, procedures, modules, functions, etc., that perform particular functions or implement particular abstract data types. The method 400 may also be practiced in a distributed computing environment where functions are performed by remote processing devices that are linked through a communication network. The order in which the method 400 is described is not intended to be construed as a limitation, and any number of the described method blocks can be combined in any order to implement the method 400, or an alternative method. Furthermore, the method 400 can be implemented in any suitable hardware, software, firmware, or combination thereof. In an embodiment, the method 400 depicted in the flow chart may be executed by a system, for example, the system 300 of FIG. 3. In an example embodiment, the system 400 may be embodied in a computing device, for example, the computing device 210 (FIG. 2).

At 402, the method includes receiving, a request for allocation of at least a subset of a computational task and a task data associated with the computational task. In an embodiment, the task data includes a data subset and one or more task constraints associated with at least the subset of the computational task. The task constraints may include, but are not limited to, end-to-end delay in completing the computational task, battery consumption associated with the computational task, utilization levels of underlying hardware (CPU/Memory/Disk/Network) and level of parallel operations that may be executed for completing the computational task.

At 404, the method 400 includes characterizing the plurality of Fog nodes capable of performing the computational task with a plurality of node characteristics to obtain a resource data associated with the plurality of Fog nodes. In an embodiment, the node characteristics may include, but are not limited to, dimensions, weight, maximum speed, battery type, battery capacity, runtime (on standby), runtime (nominal use), control and so on. It will be noted that the aforementioned node characteristics represents technical specifications of Fog nodes. However, said node characteristics should not be considered limiting to the disclosure. In alternative embodiment, the node characteristics may include various characteristics and/or specifications that may be specific to the computation task that needs to be offloaded. In an embodiment, data associated with the node characteristics may be stored in the repository of the system, wherein the system may be embodied in the coordination node. Alternatively, the data associated with the node characteristics may be stored in the repository of a remote server, and said remote server can be accessed by the coordination node and/or the system.

At 406, the method includes deriving, based on the task data and the resource data, an optimization model for performing the computational task by the plurality of Fog nodes. The optimization model may be derived based on a plurality of node constraints including battery degradation constraint, communication path loss constraint, and heterogeneous computational capacities of the plurality of Fog nodes. In an embodiment, the optimization model is derived by deriving a battery optimization model based on the resource data. The battery optimization model optimizes battery consumed in performing the computational task and communication between the coordinating node and the plurality of Fog nodes. An example of deriving a battery optimization model in a network of robotic nodes (acting as Fog nodes) is described further in the description.

In another embodiment, the optimization model is derived by deriving a latency optimization model for optimizing a time to complete the computational task based on the resource data by the set of Fog nodes. In an embodiment, deriving the latency optimization model comprises minimizing an objective function associated with a transmission throughput of the resource data. An example of the objective function associated with a transmission throughput of the resource data that is utilized to derive the latency optimization model, is described further in the description below.

In yet another embodiment, the optimization model is derived by combining the battery optimization model and the latency optimization model. An example of deriving the optimization model is derived using the battery optimization model and the latency optimization model is described further with reference to an example scenario.

At 408, the method 400 includes offloading at least a subset of the computational task to a set of Fog nodes from the plurality of Fog nodes based on the optimization model. Herein, the optimization model is capable of identifying a set of nodes that can be utilized for performing at least a subset of the computational task in the most optimal way.

An example scenario considering a network of robots acting as Fog nodes is described further with reference to FIGS. 5-10 below.

Figure 5A:
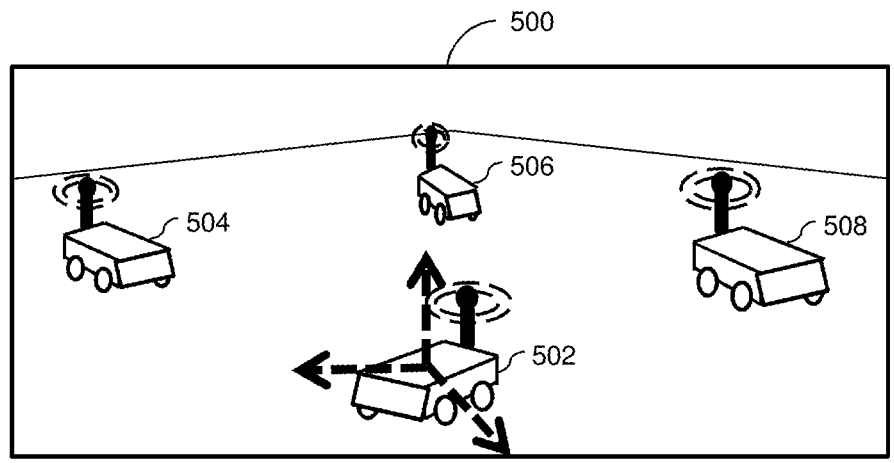
FIGS. 5A, 5B represent an example network of robotic nodes for determining optimal deployment of Fog computations in IoT environments, in accordance with an example embodiment.
Figure 5B:
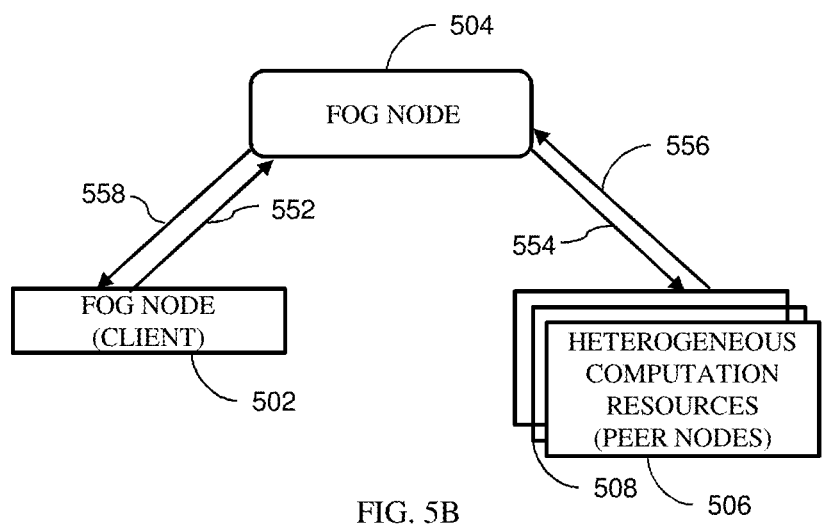
Figure 6A:
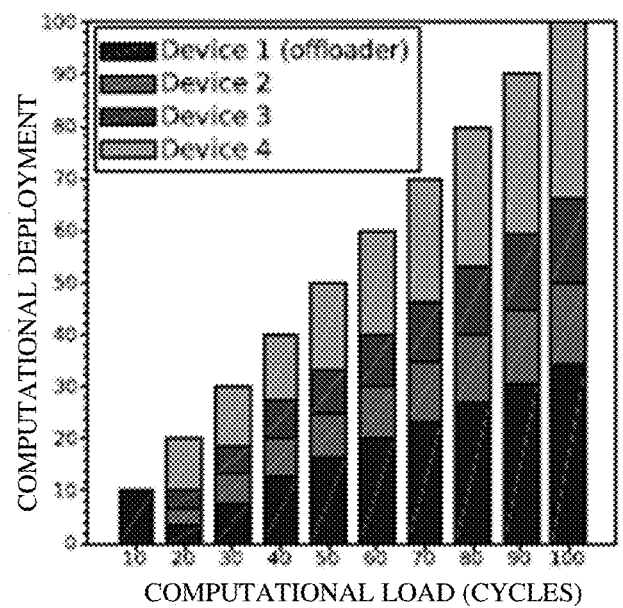
FIGS. 6A-6B illustrates an example analysis result of deployment of optimization model derived based on battery optimization model, in accordance with an example embodiment.
Figure 6B:
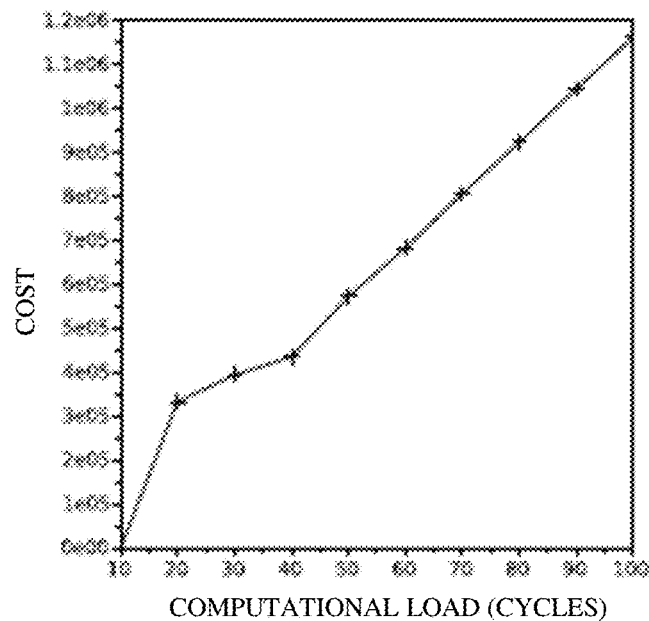

Example Scenario:

Referring now to FIGS. 5A and 5B, an example network 500 of robotic nodes is presented for determining optimal deployment of Fog computations in IoT environments in accordance with an example embodiment. Herein, in order to develop a realistic scenario where mobile nodes sense, communicate and share computational load among themselves, the network 500 of robots deployed in an indoor environment is considered. The network 500 is shown to include robots 502, 504, 506, and 508. The robots move around to collect sensor data such as location coordinates, orientation and obstacle mapping periodically. In an embodiment, the sensor data may be a huge data set, and in order to derive meaningful conclusion from the dataset, a computationally intensive task need to be performed over said dataset. As the computations can be computationally expensive, especially for large datasets, collaborative computation techniques disclosed herein is utilized. The scenario was developed by making use of ROS ("Robotic Operating System"). ROS is an open source programming language that can be ported to multiple robot hardware configurations. ROS provides services such as hardware/sensor abstractions, device control, message passing paradigms and portability across devices. ROS models may be developed in conjunction with a realistic simulation environment called Gazebo that incorporates physical constraints.

The robots (or robot nodes) 502, 504, 506, and 508 may simultaneously move in an indoor environment to perform a computational task. The objective is to complete the computational task with limited battery and computation capabilities present on the robots. Example specifications (or node characteristics) of the hardware robots may include dimensions, weight, maximum speed, battery, battery capacity, runtime (standby), runtime (nominal use), and controls, as presented in the table 1 below:

TABLE 1

| Metric | Value |
|---|---|
| Dimensions | 39 × 26.4 × 14.6 in |
| Weight | 50 kg |
| Maximum Speed | 1.0 m/s |
| Battery | Sealed Lead Acid |
| Battery Capacity | 24 V, 20 Ah |
| Runtime (standby) | 8 hours |
| Runtime (nominal use) | 3 hours |
| Control | Battery voltage, motor currents, wheel odometry and movement control |

Herein, the robots may be deployed in an indoor environment where said robots may make use of infrastructure based or infrastructure less (ad-hoc) communication. Typically, the computational task is performed locally—however, due to limited capacity and extended battery consumption of this process, the lifetime of deployed robots may be reduced. An alternative is to make use of the computational capacity of other peer nodes to offload subset of the computational task. Referring to FIG. 5B, a robot, for example, the robot 502 intending to perform a large computation may request (as indicated by 552) a coordinating node, for example the node 504 to offload at least a subset of the computational task to other available nodes in the network 500. In addition to the request, the robot 502 uploads the task data to be utilized for offloading at least the subset of the computation task.

The coordinating node divides the portion of the task data into locally solvable tasks and then requests for potential resources, at 554. The robot (which has information about the location, battery states and computation power of all robots), may act as the coordinating node and allocate tasks to available robots. Herein, the available robots such as robots 506 and 508 may receive at least a subset of the computation task along with the associated task data, and returns the subsets of the computed tasks to the coordinating node at 556. The coordinating node may collate the subsets of the computed tasks and returns a result of computational task to the robot 502, at 558.

The proposed framework architecture presented in FIGS. 5A and 5B, resembles the peer based topography for the network of robots, with a centralized coordinating node to allocate and collate tasks. The centralized coordinating node can be randomly allocated or selected based on location or computational capacity. It will be noted that while the Fog node has been presented as the coordinating node, another peer/device can also be selected to perform said optimal deployment or allocation of peer nodes for performing the computational task.

While ROS typically uses publish-subscribe messaging system to handle interactions between nodes, the framework has an implementation of the offloading of data using the client-service paradigm (FIG. 5B). Client-service ensures bi-directional transfer of data combined with one-to-one communication. The client node requests for some data and waits for the reply; the server receives the request, performs the required computation/actuation and sends a response to the client. While a network of robots has been presented in example embodiments, it can be extended to include smart gateway devices (switches, routers) or additional compute-only devices.

In the present embodiment, the optimization model is derived using the battery optimization model, a communication path loss model and heterogeneous computational capacities of the nodes. Each Fog node is characterized by its location (x, y coordinate), current drawn during computation/communication, total battery capacity, number of CPU cores and CPU operating frequency. In an exemplary embodiment, Fog node with device ID i=1 (for example, the robot 502 of FIG. 5A) may intend to offload some of the internal computation. Parameters used for the deriving the optimization model may include parameters as described in the table 2 below:

TABLE 2

| Parameter | Description |
|---|---|
| C | Total computational task to be fulfilled |
| L | Latency constraint to be fulfilled |
| i | ID of the edge/fog device with i ∈ [1, N] |
| $r_i$ | Computation task allocated to the $i^{th}$ node |
| $P_i^{cap}$ | Total battery capacity of the $i^{th}$ node |
| $P_i^c$ | Battery consumption of the $i^{th}$ node for a computation cycle c |
| $P_i^t$ | Battery consumption of the $i^{th}$ node for a transmit cycle t |
| f | Communication Transmit frequency |
| $d_{ij}$ | Distance between nodes i and j |
| $t_{ij}$ | Throughput for transmit link between nodes i, j |
| $cc_i$ | Number of CPU cores on node i |
| $h_i$ | CPU Frequency on node i |

As discussed with reference to FIGS. 3-4, the optimization model may be derived based on the battery optimization model and the latency optimization model. In an example scenario, since battery consumption for performing a computational task is a key factor that requires optimization, the optimization model may be derived by deriving a battery optimization model based on the resource data. The battery optimization model optimizes battery consumed in performing the computational task and communication between the coordinating node and the plurality of Fog nodes. The battery optimization model can be formulated as a linear programming problem with the battery consumed as a result of computation $P_i^c$ (eq. 1) and two way communication overhead 2. $P_1^t\{f, d_{1j}\}$ (eq. 2) incorporated. The total computation task C is allocated to participating devices or Fog nodes (such as nodes 506, 508), with a maximal battery capacity of $P_i^{Cap}$. The optimization can be posed as:

$$\min P_1^C \cdot r_1 + \Sigma_{i=2}^N (P_i^C + 2 \cdot P_1^t\{f, d_{1j}\}) \cdot r_i$$

$$\text{Such that, } \Sigma_{i=1}^N r_i = C$$

$$P_i \cdot r_i \leq P_i^{Cap}, \forall \in N$$

$$r_i \geq 0, \forall i \in N$$

In an embodiment, there may be battery re-charges between subsequent task executions and thus $P_i^{Cap}$ would be constant. In another embodiment, where there are no battery re-charges between runs, a new constraint $P'_i{}^{Cap} = P_i^{Cap} - P_i^C \cdot r_i$ is needed. The new constraint accounts for the power lost due to the optimal allocation during the previous execution. For the most deteriorated battery $P_i^{Cap} \to 0$ is the quickest.

In certain conditions, latency may be the predominant factor requiring optimization. As such in an embodiment, the optimization model is derived by deriving a latency optimization model for optimizing a time to complete the computational task based on the resource data by the set of Fog nodes. In an embodiment, deriving the latency optimization model comprises minimizing an objective function associated with a transmission throughput of the resource data. As each robot includes a specific number of central processing unit (CPU) cores $cc_i$ with corresponding operating frequency $h_i$ the time to complete a computation may be incorporated. For instance, a single core CPU running at 1.2 GHz may perform almost 8 times slower than a quad-core 2.4 GHz CPU. The optimization may be posed as follows, incorporating the transmission throughput $t_ij$ for data from one user to another:

$$\min\left(\frac{1}{CC_1 \cdot h_1}\right) \cdot r_1 + \sum_{i=2}^{N}\left(\frac{1}{CC_i \cdot h_i} + \frac{1}{t_{1_i}}\right) \cdot r_i +$$

Such that, $\Sigma_{i=1}^{N} r_i = C$ $r_i \geq 0, \forall i \in N3$.

In yet another embodiment, the optimization model may be derived by combining the battery optimization model and the latency optimization model. A combined model that takes into account both battery and latency constraints can also be formulated. While the primary cost function to be minimized captures the battery constraint, the entire task must be completed within the latency constraint L:

$$\min P_1^C \cdot r_1 + \sum_{i=2}^{N}(P_i^C + P_i^C + 2 \cdot P_1^t\{f, d_{1_i}\}) \cdot r_i$$

Such that, $\Sigma_{i=1}^{N} r_i = C$ $$\left(\frac{1}{CC_1 \cdot h_1}\right) \cdot r_1 + \sum_{i=2}^{N}\left(\frac{1}{CC_i \cdot h_i} + \frac{1}{t_{1_i}}\right) \cdot r_i \leq L$$

$P_i \cdot r_i \leq P_i^{Cap}, \forall i \in N$ $r_i > 0, \forall i \in N$

In an embodiment, the system may be caused to solve the aforementioned optimization models by utilizing a tool such as Scilab using the Karmarkar linear optimization solver. The nodes (or robot devices) are specified with resource data such as coordinates, battery, computational capacities and latency/energy depletion with each compute and communication cycle. The path loss model developed in eq. 2 is used in conjunction with WiFi transmission (2.40 GHz, 10 Mb/s) between the nodes. FIGS. 7A-7B, 8A-8B illustrate computation results obtained by solving the optimization models, in accordance with various embodiments.

Figure 7A:
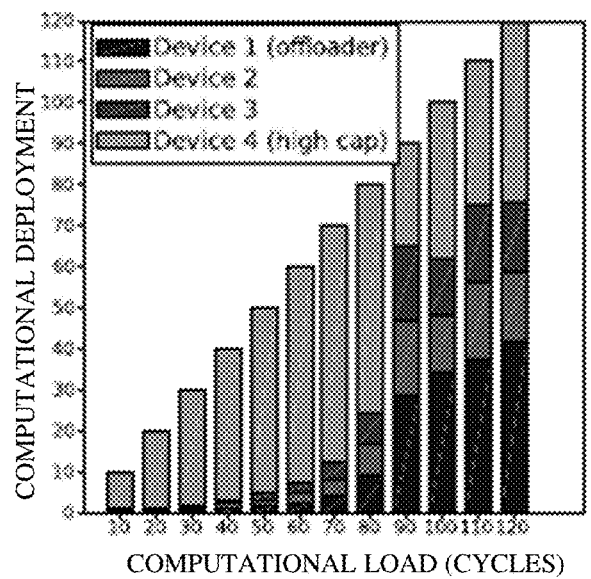
FIGS. 7A-7B illustrates an example analysis result of deployment of optimization model derived based on battery optimization model, in accordance with another example embodiment.
Figure 7B:
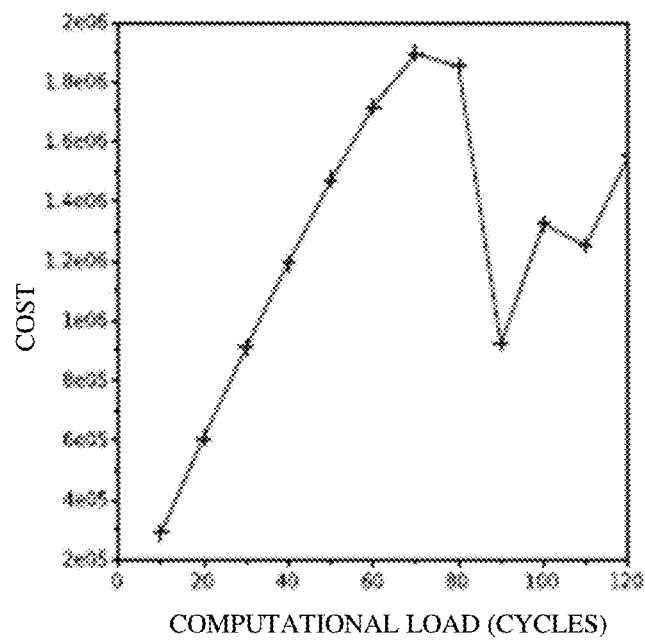

Referring now to FIGS. 7A-7B, an example analysis result of deployment of optimization model derived based on battery optimization model is illustrated. Particularly, FIG. 7A illustrates variation of computational load (associated with the computational task) plotted on X-axis with computational deployment (associated with the computational task) plotted on Y-axis. Herein, the computation deployment is assumed with no battery re-charge, and homogeneous device capacities. FIG. 7B illustrates a variation of computational load (associated with the computational task) plotted on X-axis with cost of computation plotted on Y-axis. The results are presented in FIGS. 7A, 7B where approximately proportional offloading to peers that may be dependent on the communication path loss constraints is ascertained.

Figure 8A:
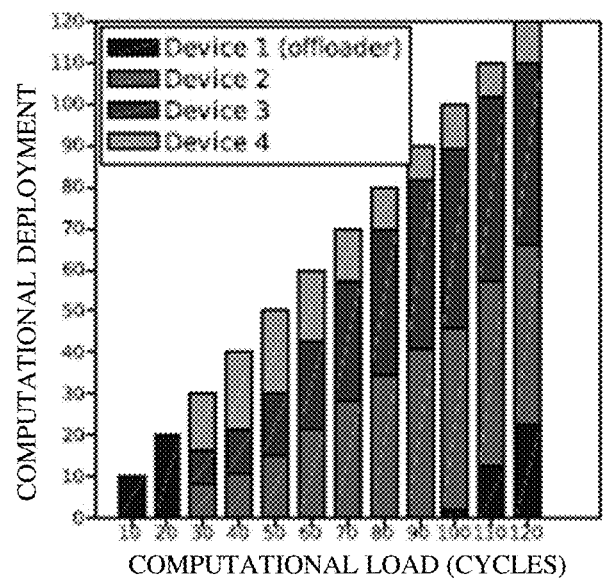
FIGS. 8A-8B illustrates an example analysis result of deployment of optimization model derived based on battery optimization model, in accordance with yet another example embodiment.
Figure 8B:
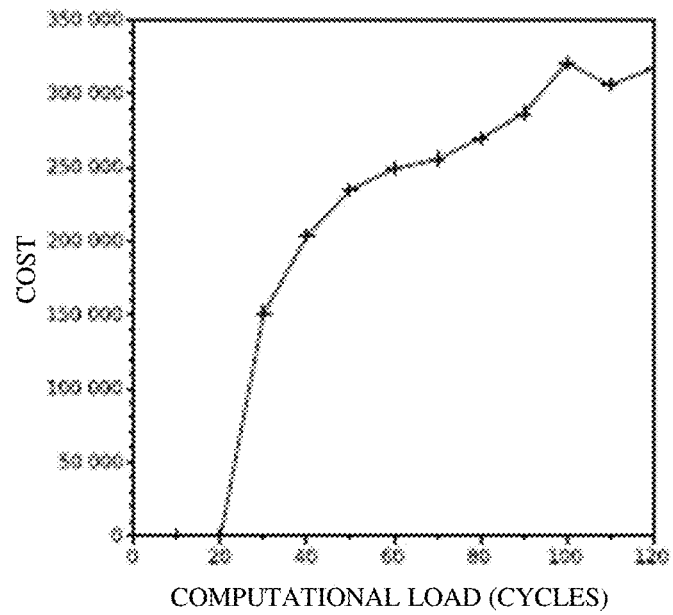

Referring now to FIGS. 8A-8B, an example analysis result of deployment of optimization model derived based on battery optimization model, in accordance with another example embodiment is illustrated. Particularly, FIG. 8A illustrates variation of computational load (associated with the computational task) plotted on X-axis with computational deployment (associated with the computational task) plotted on Y-axis. Herein, the computation deployment is assumed with no battery re-charge, and homogeneous device capacities. FIG. 8B illustrates a variation of computational load (associated with the computational task) plotted on X-axis with cost of computation plotted on Y-axis.

In the present scenario, the computation deployment assumes no battery re-charge, and heterogeneous device capacities. The results are presented in FIGS. 8A-8B, with the higher battery/computational capacity Device 4 included. Initially most of the computation is offloaded to the higher capacity device; once battery depletion of Device 4 becomes significant, other devices are increasingly utilized.

Figure 9A:
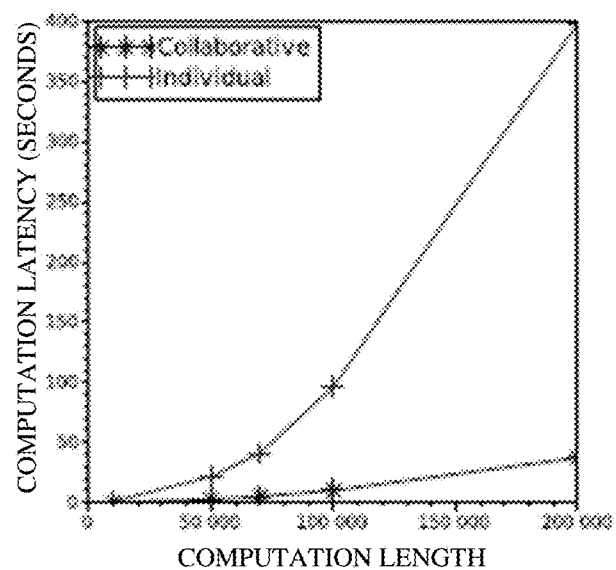
FIGS. 9A-9B illustrates an example analysis result of collaborative vs. individual computation in ROS, in accordance with an example embodiment.
Figure 9B:
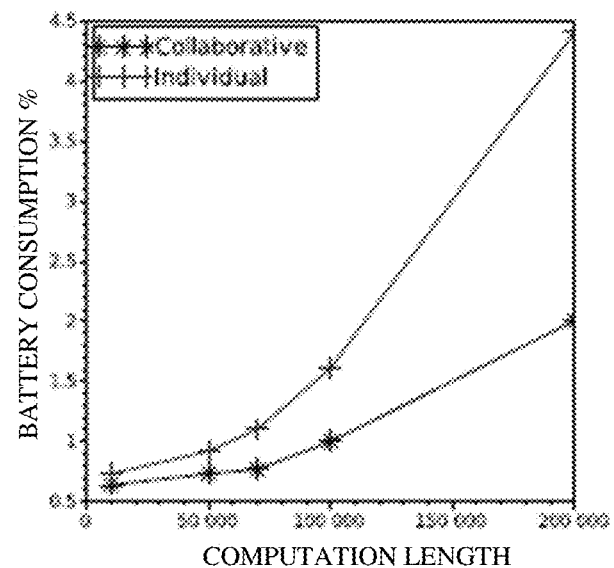
Figure 10:
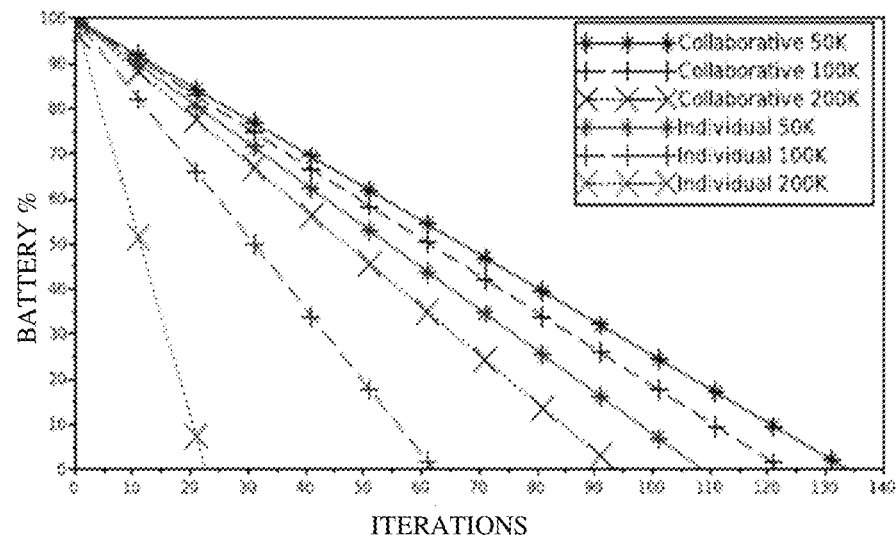
FIG. 10 illustrates an example analysis result of device battery degradation per computer iteration, in accordance with an example embodiment.

Referring now to FIGS. 9A-9B, an example analysis result of deployment of optimization model derived based on battery optimization model, in accordance with another example embodiment is illustrated. Particularly, FIG. 9A illustrates variation of computational load (associated with the computational task) plotted on X-axis with computational deployment (associated with the computational task) plotted on Y-axis. Herein, the computation deployment is assumed with no battery re-charge, and homogeneous device capacities. FIG. 9B illustrates a variation of computational load (associated with the computational task) plotted on X-axis with cost of computation plotted on Y-axis.

In the present scenario, the computation deployment assumes no battery re-charge, latency constraint, heterogeneous device capacities. The results presented in FIGS. 9A-9B once again produces a revised deployment compared to FIGS. 7A-7B. As is seen, devices or nodes closer to the off-loader are selected repeatedly in order to meet the additional latency constraint. The results of said optimization models are applied to the networked robotic network, as discussed below.

The networked robotic deployment described in earlier embodiments is developed in ROS/Gazebo on a Linux Machine with quad core i5-6200U CPU (2.30 GHz) and 4.00 GB RAM. The robots collected sensor data (location and orientation coordinates) ranging from 10, 000-200, 000 entries. A computationally expensive sorting operation is then performed over these tasks either individually or using proposed collaborative model. As all the robots were deployed on the same machine, Linux task set -c command can be used to assign a CPU core to a particular device. In order to generate realistic deployment settings, the Husky datasheet in FIG. 12 is used. The battery model in eq. 1 has been used to estimate average current drawn under standby and nominal usage $$I_{standby} = \left(\frac{20 \text{ A} - \text{h}}{8 \text{ h}}\right)^{\frac{1}{1.3}} = 2.02$$

Amperes while, $$I_{usage} = \left(\frac{20 \text{ Ah}}{3 \text{ h}}\right)^{\frac{1}{1.3}} = 4.30$$

Amperes. The path loss model developed in eq. 2 has been used in conjunction with WiFi transmission (2.40 GHz, 10 Mb/s) between the nodes. The computational load may be defined using the conventional CPU clock ticks used to perform a computation or as a function of the computational complexity. The required parameters are derived by the offloading device or via an intermediary. The results of applying the optimized deployment model are shown in FIGS. 10A-10B. Due to the higher computational capacity available, for a sorting computation done on 200, 000 entries, the improvement in latency was close to 90%. As the battery of each individual nodes were active for smaller durations, the battery usage estimated also improved in the collaborative model by 54%. The battery depleted has been included in all the devices in the collaborative model estimation. Further analysis of battery drained with computational length is shown in FIG. 11. For larger tasks, a particular device performing computations on its own would be depleted within 23 executions. However, when the collaborative model with optimized deployment (battery usage minimized) was applied, the same device could be deployed for >90 executions. As most IoT/robotic environments are constrained with respect to energy, such optimizations over energy usage should prove valuable in multiple scenarios.

In various embodiments, methods and systems for Fog based distributed computation in mobile networked environments with resource constrained devices are presented. The disclosed system is capable of accurately modelling the energy and communication costs with respect to a large scale computation, by formulating an optimal deployment strategy when dealing with distributed computation, while considering energy and latency constraints in an environment with resource constrained devices. As an example, the advantages of optimally offloading computation over a network of mobile robots simulated in ROS/Gazebo that coordinate to complete a computationally intensive task have been demonstrated in various embodiments.

In various embodiments, the system and method combines the problem of computational offloading and communication overheads by taking into account both energy and latency costs. The proposed method can lead to optimized deployment of such resource constrained devices on a network. By optimally formulating the computation and communication expenditures in terms of energy and latency, the framework can demonstrate efficient offloading of computations across a network of devices. The results are demonstrated over a network of robots developed in ROS/Gazebo, that demonstrate 90% improvement in latency and 54% improvement in battery consumptions at higher loads. Such a deployment framework can prove useful in multiple scenarios involving Fog based networking architectures for IoT devices.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method for dynamically managing Fog computations between a coordinating node and a plurality of Fog nodes, the method at the coordinating node comprising:

receiving, a request for allocation of at least a subset of a computational task, and a task data associated with the computational task, via one or more hardware processors, the task data comprising data subset and one or more task constraints associated with at least the subset of the computational task;

characterizing the plurality of Fog nodes capable of performing the computational task with a plurality of node characteristics to obtain a resource data associated with the plurality of Fog nodes, via the one or more hardware processors;

deriving, based on the task data and the resource data, an optimization model for performing the computational task by the plurality of Fog nodes, via the one or more hardware processors, the optimization model comprises a plurality of node constraints including battery degradation constraint, communication path loss constraint, and heterogeneous computational capacities of the plurality of Fog nodes;

offloading at least the subset of the computational task to a set of Fog nodes from the plurality of Fog nodes based on the optimization model, via the one or more hardware processors; and collating output of performing of the subset of computational task from the set of Fog nodes to obtain result of offloaded subset of the computational task.

2. The method of claim 1, further comprising communicating with the plurality of Fog nodes while receiving the request and offloading at least the subset of the computational task using one of a proxy-based communication topology, peer-based communication topology and clone-based communication topology.

3. The method of claim 2, wherein the resource data comprises node location, current drawn during performing the computational task and communication, total battery capacity, number of CPU cores and CPU operating frequency associated with the plurality of Fog nodes.

4. The method of claim 1, wherein deriving the optimization model comprises deriving a battery optimization model for optimizing battery consumed in performing the computational task and a communication between the coordinating node and the plurality of Fog nodes, based on the resource data.

5. The method of claim 4, wherein deriving the battery optimization model comprises minimizing an objective function associated with the battery consumption based on an equation:

$$\min P_1^C \cdot r_1 + \Sigma_{i=2}^N (P_i^C + 2 \cdot P_1^t\{f, d_{1_i}\}) \cdot r_i$$

Such that, $\Sigma_{i=1}^N r_i = C$ $P_i \cdot r_i \leq P_i^{Cap}, \forall i \in N$ $r_i \geq 0, \forall i \in N$ where, $P_i^c$ is battery consumed as a result of computation C for ith fog node, and $P_i^{cap}$ is the battery capacity.

6. The method of claim 1, wherein deriving the optimization model comprises deriving a latency optimization model for optimizing a time to complete the computational task based on the resource data by the set of Fog nodes.

7. The method of claim 6, wherein deriving the latency optimization model comprises minimizing an objective function associated with a transmission throughput of the resource data based on an equation:

$$\min\left(\frac{1}{CC_1 \cdot h_1}\right) \cdot r_1 + \sum_{i=2}^N \left(\frac{1}{CC_i \cdot h_i} + \frac{1}{t_{1_i}}\right) \cdot r_i +$$

Such that, $\Sigma_{i=1}^N r_i = C$ $r_i \geq 0, \forall i \in N3$, where, $CC_i$ represents number of CPU cores and corresponding operating frequency $h_i$ associated with ith Fog node, and $t_{j_i}$ represents transmission throughput.

8. The method of claim 1, wherein deriving the optimization model comprises:
deriving a battery optimization model for optimizing battery consumed in performing the computational task based on the resource data by the set of Fog nodes; and
deriving a latency optimization model for optimizing a time to complete the computational task based on the resource data by the set of Fog nodes, wherein deriving the battery optimization model and the latency optimization model comprises minimizing an objective function defined as:

$$\min P_1^C \cdot r_1 + \sum_{i=2}^N (P_i^C + P_i^C + 2 \cdot P_1^t\{f, d_{1_i}\}) \cdot r_i$$

Such that, $\Sigma_{i=1}^N r_i = C$ $$\left(\frac{1}{CC_1 \cdot h_1}\right) \cdot r_1 + \sum_{i=2}^N \left(\frac{1}{CC_i \cdot h_i} + \frac{1}{t_{1_i}}\right) \cdot r_i \leq L$$

$P_i \cdot r_i \leq P_i^{Cap}, \forall i \in N$ $r_i > 0, \forall i \in N$

Where, $P_i^c$ is battery consumed as a result of computation C for ith fog node, and $P_i^{cap}$ is the battery capacity, $CC_i$ represents number of CPU cores and corresponding operating frequency $h_i$ associated with ith Fog node, and $t_{j_i}$ represents transmission throughput.

9. A system for dynamically managing Fog computations between a coordinating node and a plurality of Fog nodes, the system comprising:
one or more memories storing instructions; and one or more hardware processors coupled to the one or more memories, wherein said one or more hardware processors are configured by said instructions to:
receive, a request for allocation of at least a subset of a computational task, and a task data associated with the computational task, the task data comprising data subset and one or more task constraints associated with at least the subset of the computational task;
characterize the plurality of Fog nodes capable of performing the computational task with a plurality of node characteristics to obtain a resource data associated with the plurality of Fog nodes;
derive, based on the task data and the resource data, an optimization model for performing the computational task by the plurality of Fog nodes, the optimization model comprises a plurality of node constraints including battery degradation constraint, communication path loss constraint, and heterogeneous computational capacities of the plurality of Fog nodes;
offload at least the subset of the computational task to a set of Fog nodes from the plurality of Fog nodes based on the optimization model; and
collate output of performing of the subset of computational task from the set of Fog nodes to obtain result of offloaded subset of the computational task.

10. The system of claim 9, wherein the one or more hardware processors are further configured by the instructions to to communicate with the plurality of Fog nodes while receiving the request and offloading at least the subset of the computational task using one of a proxy-based communication topology, peer-based communication topology and clone-based communication topology.

11. The system of claim 10, wherein the resource data comprises node location, current drawn during performing the computational task and communication, total battery capacity, number of CPU cores and CPU operating frequency associated with the plurality of Fog nodes.

12. The system of claim 9, wherein to derive the optimization model, wherein the one or more hardware processors are further configured by the instructions to derive a battery optimization model for optimizing battery consumed in performing the computational task and a communication between the coordinating node and the plurality of Fog nodes, based on the resource data.

13. The system of claim 12, wherein to derive the battery optimization model, the one or more hardware processors are further configured by the instructions to minimize an objective function associated with the battery consumption based on an equation:

$$\min P_1^C \cdot r1 + \Sigma_{i=2}^N (P_i^C + 2 \cdot P_1^t\{f, d_{1_i}\}) \cdot r_i$$

Such that, $\Sigma_{i=1}^N r_i = C$ $P_i \cdot r_i \leq P_i^{Cap}, \forall i \in N$ $r_i \geq 0, \forall i \in N$ where, $P_i^c$ is battery consumed as a result of computation C for ith fog node, and $P_i^{cap}$ is the battery capacity.

14. The system of claim 9, wherein to derive the optimization model, the one or more hardware processors are further configured by the instructions to derive a latency optimization model for optimizing a time to complete the computational task based on the resource data by the set of Fog nodes.

15. The system of claim 14, wherein to derive the latency optimization model, the one or more hardware processors are further configured by the instructions to minimize an objective function associated with a transmission throughput of the resource data based on an equation:

$$\min \left(\frac{1}{CC_1 \cdot h_1}\right) \cdot r_1 + \sum_{i=2}^N \left(\frac{1}{CC_i \cdot h_i} + \frac{1}{t_{1_i}}\right) \cdot r_i +$$

Such that, $\Sigma_{i=1}^N r_i = C$ $r_i \geq 0, \forall i \in N3,$

Where, $CC_i$ represents number of CPU cores and corresponding operating frequency $h_i$ associated with ith Fog node, and $t_{j_i}$ represents transmission throughput.

16. The system of claim 9, wherein to derive the optimization model, wherein the one or more hardware processors are further configured by the instructions to:
derive a battery optimization model for optimizing battery consumed in performing the computational task based on the resource data by the set of Fog nodes; and
derive a latency optimization model for optimizing a time to complete the computational task based on the resource data by the set of Fog nodes, wherein deriving the battery optimization model and the latency optimization model comprises minimizing an objective function defined as:

$$\min P_1^C \cdot r_1 + \sum_{i=2}^N (P_i^C + P_i^C + 2 \cdot P_1^t\{f, d_{1_i}\}) \cdot r_i$$

Such that, $\Sigma_{i=1}^N r_i = C$ $$\left(\frac{1}{CC_1 \cdot h_1}\right) \cdot r_1 + \sum_{i=2}^N \left(\frac{1}{CC_i \cdot h_i} + \frac{1}{t_{1_i}}\right) \cdot r_i \leq L$$

$P_i \cdot r_i \leq P_i^{Cap}, \forall i \in N$ $r_i > 0, \forall i \in N$

Where, $P_i^c$ is battery consumed as a result of computation C for ith fog node, and $P_i^{cap}$ is the battery capacity, $CC_i$ represents number of CPU cores and corresponding operating frequency $h_i$ associated with ith Fog node, and $t_{j_i}$ represents transmission throughput.

17. A non-transitory computer-readable medium having embodied thereon a computer program for executing a method for dynamically managing Fog computations between a coordinating node and a plurality of Fog nodes, the method comprising:

receiving, a request for allocation of at least a subset of a computational task, and a task data associated with the computational task, the task data comprising data subset and one or more task constraints associated with at least the subset of the computational task;

characterizing the plurality of Fog nodes capable of performing the computational task with a plurality of node characteristics to obtain a resource data associated with the plurality of Fog nodes;

deriving, based on the task data and the resource data, an optimization model for performing the computational task by the plurality of Fog nodes, the optimization model comprises a plurality of node constraints including battery degradation constraint, communication path loss constraint, and heterogeneous computational capacities of the plurality of Fog nodes;

offloading at least the subset of the computational task to a set of Fog nodes from the plurality of Fog nodes based on the optimization model; and collating output of performing of the subset of computational task from the set of Fog nodes to obtain result of offloaded subset of the computational task.

* * * * *